(12) United States Patent
Georgiev

(10) Patent No.: US 9,083,733 B2
(45) Date of Patent: Jul. 14, 2015

(54) ANTI-PHISHING DOMAIN ADVISOR AND METHOD THEREOF

(75) Inventor: Milen Georgiev, Toronto (CA)

(73) Assignee: Visicom Media Inc., Bossard (Quebec) (CA)

( * ) Notice: Subject to any disclaimer, the term of this patent is extended or adjusted under 35 U.S.C. 154(b) by 489 days.

(21) Appl. No.: 13/195,247

(22) Filed: Aug. 1, 2011

(65) Prior Publication Data

US 2013/0036468 A1    Feb. 7, 2013

(51) Int. Cl.
*G06F 12/14* (2006.01)
*H04L 29/06* (2006.01)
*G06F 21/51* (2013.01)
*H04L 29/12* (2006.01)

(52) U.S. Cl.
CPC ............ *H04L 63/1425* (2013.01); *G06F 21/51* (2013.01); *H04L 61/1511* (2013.01); *H04L 63/101* (2013.01); *H04L 63/1483* (2013.01)

(58) Field of Classification Search
CPC ............ H04L 63/1408; H04L 63/1416; H04L 63/1466; H04L 63/1458; H04L 63/1483; G06F 21/60
USPC ................................ 713/162, 187; 726/11, 23
See application file for complete search history.

(56) References Cited

U.S. PATENT DOCUMENTS

| 7,438,226 | B2 | 10/2008 | Helsper et al. | |
|---|---|---|---|---|
| 7,603,699 | B2 | 10/2009 | Abdulhayoglu | |
| 7,831,915 | B2 | 11/2010 | Averbuch et al. | |
| 2003/0182447 | A1* | 9/2003 | Schilling | 709/245 |
| 2007/0261112 | A1* | 11/2007 | Todd et al. | 726/11 |
| 2008/0028444 | A1 | 1/2008 | Loesch et al. | |
| 2008/0147837 | A1 | 6/2008 | Klein et al. | |
| 2009/0013089 | A1 | 1/2009 | Sullivan et al. | |
| 2010/0049975 | A1 | 2/2010 | Parno et al. | |
| 2010/0106854 | A1* | 4/2010 | Kim et al. | 709/238 |
| 2010/0125663 | A1 | 5/2010 | Donovan et al. | |
| 2010/0169975 | A1 | 7/2010 | Stefanidakis et al. | |
| 2010/0262688 | A1 | 10/2010 | Hussain et al. | |
| 2011/0191495 | A1* | 8/2011 | Sullivan et al. | 709/242 |
| 2012/0255004 | A1* | 10/2012 | Sallam | 726/23 |

* cited by examiner

*Primary Examiner* — Eleni Shiferaw
*Assistant Examiner* — Paul Callahan
(74) *Attorney, Agent, or Firm* — M&B IP Analysts, LLC

(57) ABSTRACT

A method of anti-phishing and domain name protection. The method comprises capturing a system call sent to an operating system of a client by an application requesting an access to an Internet resource; extracting a URL included in the captured system call; capturing a response to the system call sent from operating system to the application; determining if the system call's response includes any one of a domain name system (DNS) error code and fake internet protocol (IP) address; checking the extracted URL against an anti-phishing blacklist to determine if the Internet resource is a malicious website; performing a DNS error correction action if any one of the DNS error code and the fake IP address was detected; and performing an anti-phishing protection action if the internet resource is determined to be a malicious website.

15 Claims, 4 Drawing Sheets

ANTI-PHISHING DOMAIN ADVISOR AND METHOD THEREOF

TECHNICAL FIELD

This invention generally relates to techniques for allowing safe browsing of the Internet, and more particularly to protecting from phishing attacks and redirection errors.

BACKGROUND OF THE INVENTION

The Internet has rapidly changed the way people access information. The Internet gives users access to a vast number of resources from locations around the world. In addition, the Internet allows users to perform commercial transactions and share private and sensitive information. A significant concern when browsing the Internet is the vulnerability of the Web to attacks from malicious individuals or organizations. Thus, the security of information that can be accessed or saved in websites is a challenge.

One type of fraudulent act over the Internet is known as phishing, which has become one the fastest growing online threats. In the last few years, there have been sharp increases in the number of phishing attacks over the Internet, thus users are now looking for effective ways for blocking such attacks.

Phishing refers to an attempt to fraudulently retrieve sensitive information, such as bank account information, SSNs, passwords, and credit card information, by masquerading as a trustworthy person or business with a real need for such information. A phishing attack can be committed in two different ways. One way includes sending an email to a user, requesting that the user click on a link in the email that directs the user to enter sensitive information on the ensuing website. Because the links and websites are usually near exact copies of valid websites of well-known enterprises, such as banks, the user is fooled into thinking the websites are legitimate and hence secure.

Another way to commit a phishing attack (also known as pharming) is by redirection of a user to an illegitimate website through technical means. This is typically performed by exploitation of vulnerability in the domain name server (DNS) server software that allows a hacker to acquire the domain name for a site, and to redirect traffic from that website to another website of the fraudster. For example, an Internet banking customer, who routinely logs in to his online banking account through the bank website, may be redirected to an illegitimate website. As another example, if the user mistyped the address of the bank's website, in the browser address bar, then instead of being redirected to the bank's website holding his/her account, the user is redirected to a website of the fraudster.

A DNS translates domain names meaningful to humans into the numerical identifiers, i.e., IP addresses associated with networking equipment for the purpose of locating and addressing these devices worldwide. Typically, the DNS is located at the internet service provider (ISP). A DNS error is typically returned when the DNS cannot locate the IP address associated with the hostname. Hackers and even organizations can utilize DNS errors to perform a DNS hijacking which allows the hijacker to display malicious web pages on the user's browser.

Several solutions for detection of phishing attempts that are DNS-based and browser-based are discussed in the related art. The DNS-based protection looks up the translated IP address of a respective hostname in an address blacklist, and if found then a warning is sent to the user's browser and the request is not sent to the illegitimate website. The address blacklist is frequently updated. The disadvantage of this technique that it can monitor only hostnames, but not variance of the URLs given to a domain name. For example, a DNS may translate the host name of www.eBey.com to an IP address designated in the blacklist, but the URL www.eBey.com/vaction.html, may not be alerted.

The browser-based detection solution includes a phishing filter that checks the URL as it appears in the browser address bar against a list of sites that are considered fraudster. If the requested site, as designated in the URL, is considered to be a phishing threat, the browser is redirected to a website that returns a warning to the user. The phishing filter is either part of the browser or is installed as a third party browser add-on. However, an anti-phishing filter is limited to certain types of web browsers and cannot work across platforms (different browsers).

Therefore, it would be advantageous to provide an anti-phishing solution that overcomes the deficiencies of the solutions discussed above. It would be further advantageous if the anti-phishing solution would also handle DNS errors for securing a client.

SUMMARY OF THE INVENTION

Certain embodiments disclosed herein include a method of anti-phishing and domain name protection. The method comprises capturing a system call sent to an operating system of a client by an application requesting an access to an Internet resource; extracting a URL included in the captured system call; capturing a response to the system call sent from operating system to the application; determining if the system call's response includes any one of a domain name system (DNS) error code and fake internet protocol (IP) address; checking the extracted URL against an anti-phishing blacklist to determine if the Internet resource is a malicious website; performing a DNS error correction action if any one of the DNS error code and the fake IP address was detected; and performing an anti-phishing protection action if the internet resource is determined to be a malicious website.

Certain embodiments disclosed herein also include an anti-phishing domain advisor. The anti-phishing advisor comprises an interface for interfacing between an operating system of a client and at least one application executed over the client, wherein the interface monitors and captures system calls sent by the at least one application to the operating system and responses to the system calls as generated by the operating system; a memory for storing at least an anti-phishing blacklist; and a processor connected to the interface for determining if a system call's response generated in response to a system call's request of the at least one application to access an internet resource includes any one of a domain name system (DNS) error code and a fake IP address; checking a URL extracted from the system call's request against the anti-phishing blacklist to determine if the Internet resource is a malicious website; performing a DNS error correction action if any one of the DNS error code and the fake IP address was detected; and performing an anti-phishing protection action if the internet resource is determined to be a malicious website.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
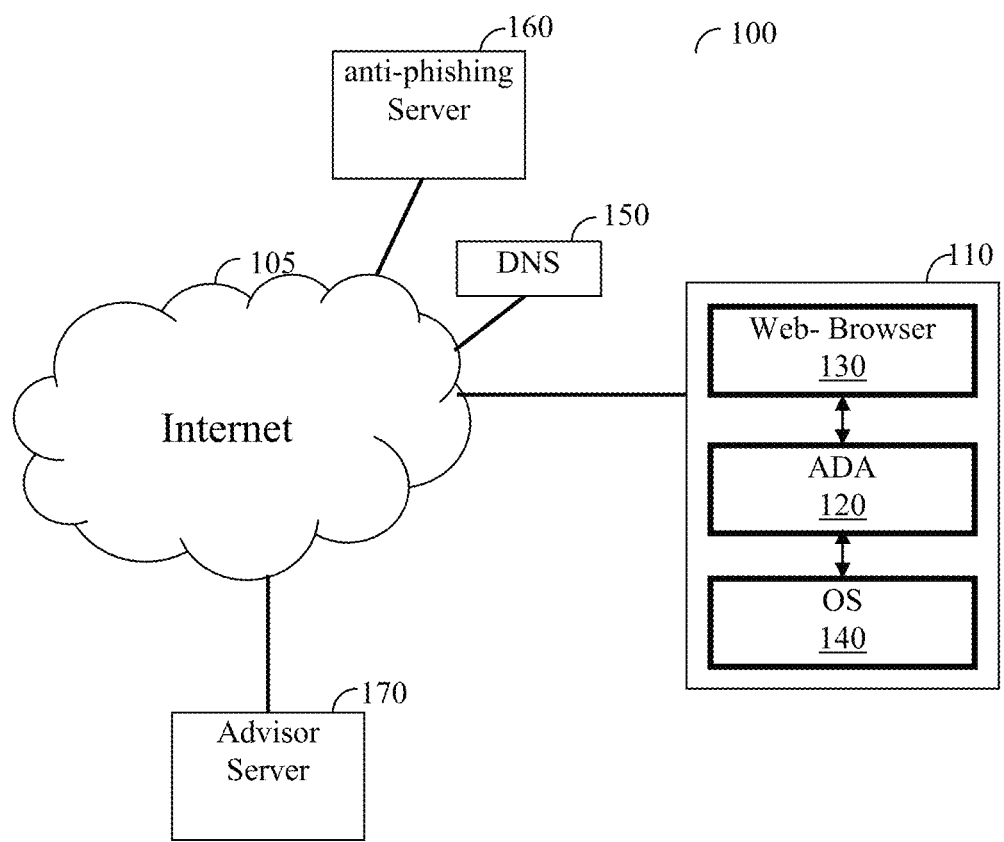
FIG. 1 is a schematic diagram of a system useful in describing certain embodiments of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a schematic diagram of a system 100 useful in describing the embodiments of the invention. A client 110 runs a web browser 130 which may be, for example, Microsoft® Internet Explorer®, Mozilla Firefox®, Opera, Safari, a wireless application protocol (WAP) type browser, and the like. The client 110 may be a computing device, such as a personal computer, a laptop computer, a personal digital assistant (PDA), a mobile phone, a smart phone, a tablet computer, and the like. The web browser 130 provides the client 110 an access to the Internet 105.

The client 110 includes an anti-phishing domain advisor (ADA) 120 constructed according to an embodiment of the invention. The ADA 120 is installed as a low-level system utility and is operable between an operating system 140 of the client 110 and software applications, such as the web browser 130. The ADA 120 interfaces between the OS 140 API and the software applications requesting services from the operating system. Therefore, the ADA 120 can capture and monitor any system call request and response sent or received from the applications to the OS 140, and specifically any requests and responses that are targeted to/from a resource that resides in the Internet 105.

It should be noted that although a web browser 130 is shown in FIG. 1, other software applications can be handled by the ADA 120 without departing from the scope of the invention. For example, software applications including, but not limited to, email applications, smartphone applications (i.e., applications executed on smartphones and/or tablet computers), or any other software application that can access the Internet and be executed by the client 110. In an embodiment of the invention, the ADA 120 comprises computer-readable instructions that reside on some type of computer readable medium. According to this embodiment, the ADA 120 is downloaded to the client 110 and initialized upon booting of the client 110.

Also connected in the Internet cloud 105 are a DNS 150 and a third-party anti-phishing server 160. The DNS 150 provides an IP address to a URL requested by the client 110. The anti-phishing server 160 constantly monitors the Internet for threats from phishing scams, i.e., URLs of websites that can commit phishing attacks. The anti-phishing server 160 generates a blacklist containing IP addresses of malicious websites. The blacklist is frequently updated.

The ADA 120 maintains a copy of the blacklist as generated by the anti-phishing server 160. According to an embodiment of the invention, the ADA 120 retrieves the list from the anti-phishing server 160 at predefined time interval, e.g., every 60 seconds.

According to certain embodiments of the invention, also connected in the Internet cloud 105 is an advisor server 170 adapted to handle requests redirected by the ADA 120. In response to a redirect request, the advisor server 170 generates a web page to be displayed over the web browser 130. An example for the web page rendered by the web browser 130 is discussed below.

Figure 2:
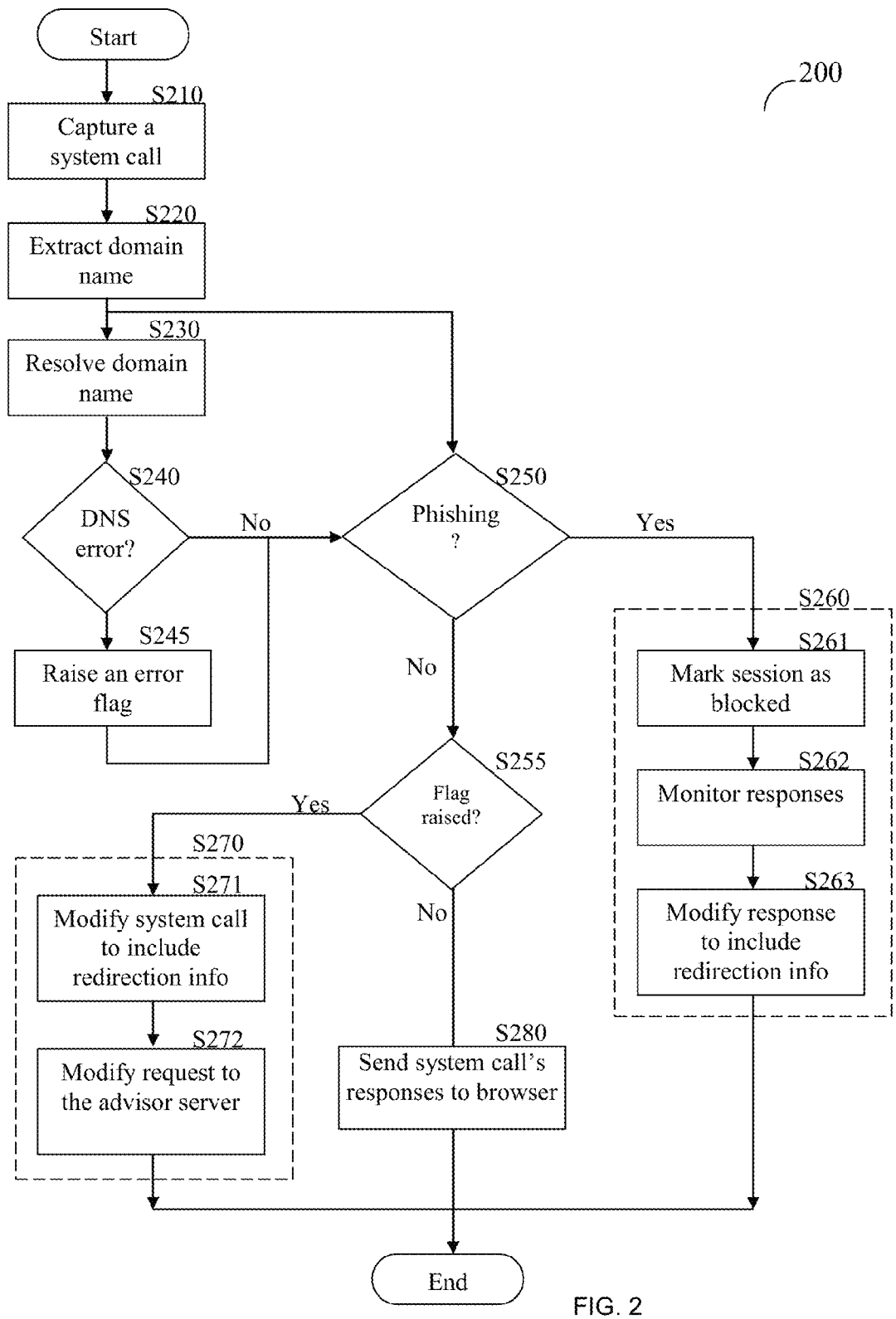
FIG. 2 is a flowchart illustrating the operation of the anti-phishing domain advisor (ADA) according to certain embodiments of the invention.

FIG. 2 shows a non-limiting and exemplary flowchart 200 illustrating the operation of the ADA 120 according to certain embodiments of the invention. The ADA 120 provides an anti-phishing protection that considers both DNS errors and malicious websites that commit phishing attacks. The protection is available for all applications on the client 110 that access the Internet. It should be noted that the ADA 120 does not require reconfiguration of any of the clients 110, the web browser 130, or any protected applications.

At S210, a system call generated by the browser as a result of a request (e.g., a HTTP request) to access a resource over the Internet is captured. For example, such a system call may be generated when the user types an address in the address bar of the web browser or clicks on a hyperlink. The system calls generated by the web browser 130 are directed to the OS 140. The system calls may include requests for domain name resolution or accessing an Internet resource (e.g., a web server hosting a website).

As mentioned above, the ADA 120 is hooked to the OS 140 API, thus any system calls generated by the web browser 130 and responses from the OS 140 can be monitored by the ADA 120. According to a preferred embodiment, the ADA 120 handles system calls for domain name resolution and for sending data from the browser as well as responses generated by the OS in response to such calls. Typically, the web browser 130 initiates a request for a domain name resolution for an Internet resource (e.g., a web server hosting a website) and then sends a request to access the Internet resource using the resolved IP address of the resource.

At S220, the URL is extracted from the captured system call and provided as an input to S250. At S230, the system calls is returned from the OS 140, in response to a call for resolving the domain name, are monitored. At S240, it is determined if such responses include a DNS error code or a fake IP address. To determine a fake IP, a check is made to determine if the IP address included in the response is the same as an IP determined to be fake. The fake IP is typically returned by a DNS hijacker. Thus, according to an embodiment of the invention, the ADA 120 sends a DNS resolution request to the DNS 150 using a domain name that does not exist. If the DNS 150 returns a valid IP address, then this IP address is determined to be fake. It should be noted that such an inquiry can be performed only when the ADA 120 is initialized.

If S240 returns an affirmative answer, execution continues with S245 where a flag indicating that a DNS error was detected is raised, and the system call returned by the OS 140 is held until completing the anti-phishing checks; otherwise, execution proceeds to S250.

At S250, the extracted URL or a resolved IP address is checked against the blacklist generated by the anti-phishing server to determine if the requested URL is associated with a malicious website. If so, execution continues with S260 where an anti-phishing protection procedure is applied; otherwise, proceeding to S255, where another check is made to determine if the DNS error flag is raised. If S255 results with an affirmative answer, execution continues with S270 where a DNS error correction procedure is applied; otherwise, execution continues with S280, where the system calls as generated in response to a client's request are sent back to the web browser 130. Then, execution terminates.

It should be noted that the checks to detect anti-phishing URLs and DNS errors can be performed at the same time. According to an embodiment of the invention, a check for a DNS error is performed followed by a check for detection of potential phishing attacks, in order to avoid mitigate situations where a malware is installed in the clients 110 that manipulates DNS errors for performing phishing attacks or DNS hijacking.

According to an embodiment of the invention, the anti-phishing protection procedure S260 is performed during an active HTTP session between the web browser 130 and an Internet resource. At S261, the HTTP session is marked as blocked. As the OS 140 is required to send the HTTP request to the Internet resource, at S262, all responses returned by the Internet resource are monitored. This is performed by checking system calls that send such responses to the web browser 130. At S263, once a response of a session marked as blocked is detected, the response is modified to include redirection information to navigate the web browser 130 to the advisor web server 170. Thus, instead of displaying a web page from the malicious website, a web page generated by the advisor website 170 is rendered by the web browser 130. For example, if the response is a HTTP response, then the HTTP header is modified to include the address (part of the redirection information) of the advisor server 170. According to an embodiment of the invention, the redirection information also includes the domain name from the URL extracted at S220.

According to another embodiment, the redirection information includes a message that describes the detected problem and the reason for the redirection. The redirection information causes the web browser 130 to navigate to the advisor server 170, which provides a web page generated, in part, using the domain name and message included in the redirection information. Then, the web page generated by the advisor server 170 is displayed over the web browser 130.

The DNS error correction procedure S270 includes modifying the system call returned by the OS 140 in response to a DNS resolution request (S271). The modification includes replacing the DNS error code with the redirection information. The redirection information includes an IP address of the advisor server 170 and the domain name from the URL extracted at S220. The web browser 130 will access the advisor server 170 using the redirection information. The modified response will cause the web browser to send a HTTP request to the advisor server 170. At S272, a system call generated as a result of the HTTP request is modified to include a message regarding the detected problem and the reason for the redirection. Then, the web page as provided by the advisor server 170 is displayed over the web browser 130.

According to certain embodiments of the invention, the web server 170 generates a web page that includes hyperlinks to websites that are related to the domain name included in the redirection information. The hyperlinks contained in the generated web page may be sponsored links. Thus, the anti-phishing protection solution disclosed herein can be utilized for collecting revenues. That is, if a user clicks on one of the sponsored links, then the provider of the web page referring to a website of the sponsor receives a commission for such a referral.

According to an embodiment of the invention, the advisor server 170 searches the Internet using the keyword which is the domain name and organizes the results according to their relevance to the user. The search may be performed using conventional search engines, e.g., Google®. As mentioned above, the web page when displayed by the browser 130 may include the search results and a message regarding the nature of the detected problem.

Figure 3:
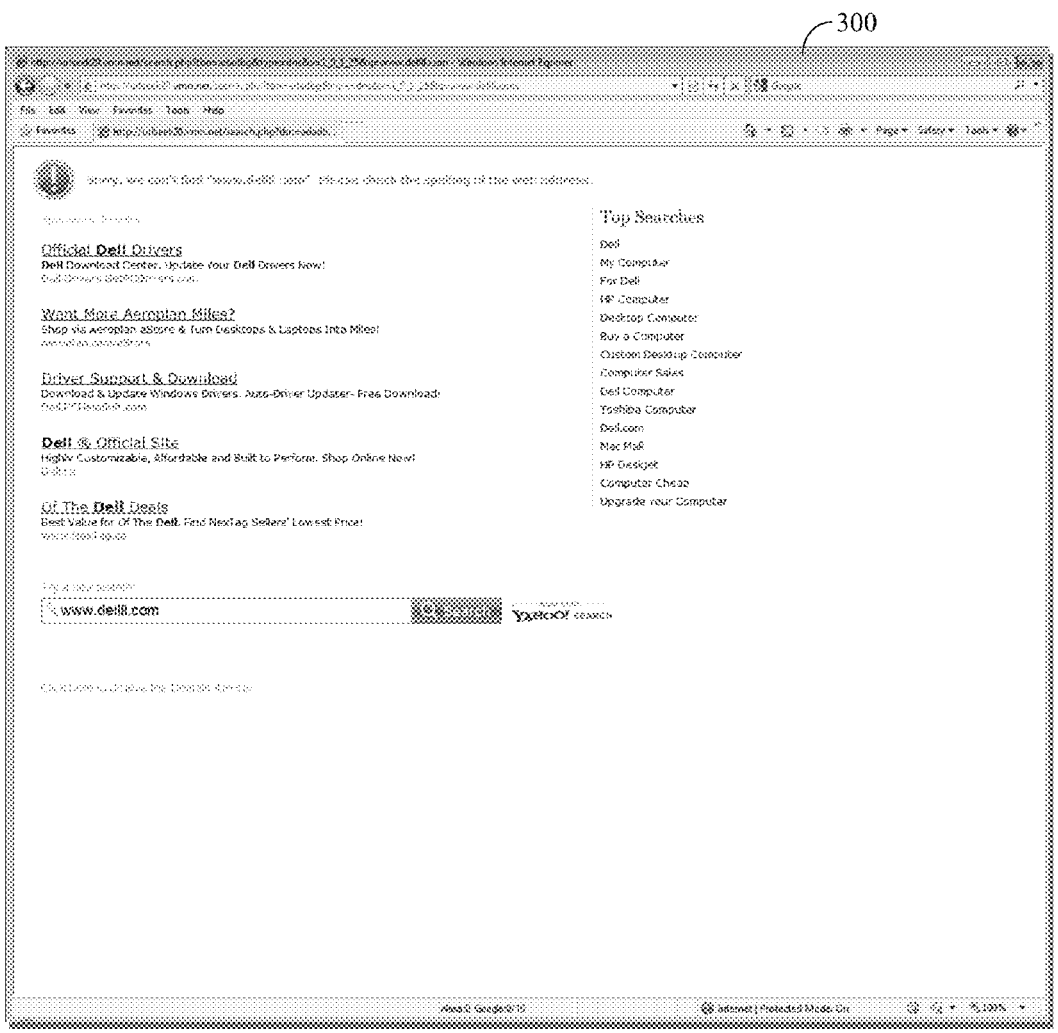
FIG. 3 is a screenshot of a web page generated according to an embodiment of the invention.

An exemplary screenshot of a web page 300 generated in a response to malicious URL, according to an embodiment of the invention, is shown in FIG. 3. In this example, the malicious URL is "delll.com" where the user tries to access the website of Dell® (dell.com). Thus, the returned results are associated with websites where computing equipment may be purchased. As shown in FIG. 3, one of the hyperlinks included in the web page 300 is of dell.com. As mentioned earlier, one or more the hyperlinks are "sponsored links".

Figure 4:
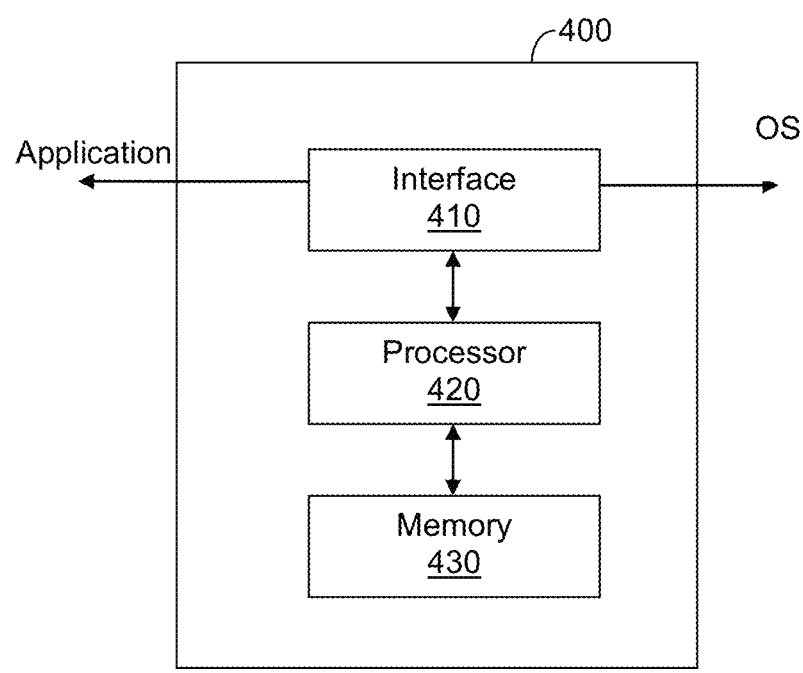
FIG. 4 is a block diagram of the ADA according to an embodiment of the invention.

FIG. 4 shows an exemplary and non-limiting block diagram of the ADA 120 according to an embodiment of the invention. The ADA 120 includes an interface 410, a processor 420, and a memory 430. The interface 430 interfaces between the operating system 140 and the web browser 130 for monitoring and capturing system calls sent by the web browser to the operating system and responses to the system calls as generated by the operating system. The memory 430 stores the anti-phishing blacklist retrieved from the anti-phishing server 160 and may maintain the URL extracted from requests to access internet resources.

The processor 420 performs the tasks of processing system calls captured by the interface to detecting attempts for phishing attacks, domain attacks (e.g., DNS hijacking) and DNS errors. The processor 420 also performs the tasks of the DNS error correction and anti-phishing protection actions, when such actions are required. The tasks performed by the processor 420 discussed in detail above.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers may be combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

I claim:

1. A method of anti-phishing and domain name protection, comprising:
   capturing a system call sent to an operating system of a client by an application requesting an access to an Internet resource;
   extracting a URL included in the captured system call;
   capturing a response to the system call sent from operating system to the application;
   determining when the system call's response includes any one of a domain name system (DNS) error code and fake internet protocol (IP) address, wherein the determination of when the system call's response includes a fake IP address includes: sending a DNS resolution request to a DNS with a non-exist domain name; determining when the DNS returns a valid IP address; and when the DNS returns a valid IP address, then the IP address returned by the system call's response is a fake IP address generated by a DNS hijacker;
   checking the extracted URL against an anti-phishing blacklist to determine when the Internet resource is a malicious website;
   performing a DNS error correction action when any one of the DNS error code and the fake IP address was detected; and
   performing an anti-phishing protection action when the internet resource is determined to be a malicious website.

2. The method of claim 1, wherein each of the DNS error correction action and anti-phishing protection action causes redirection of the application to an advisor server, wherein the advisor server generates a web page to be displayed by the application.

3. The method of claim 2, wherein the DNS error correction action further includes:
   modifying the system call's response including the DNS error code by replacing the DNS error code with redirection information, wherein the redirection information includes at least an IP address of the advisor server and the extracted URL; and
   sending the modified system call's response to the application, thereby causing the application to access the advisor server.

4. The method of claim 3, wherein the redirection information further includes at least one of: the extracted URL and a message indicating the detected DNS error.

5. The method of claim 4, wherein the web page generated by the advisor server includes a list of hyperlinks related to the extracted URL.

6. The method of claim 5, wherein one or more of the hyperlinks are sponsored links.

7. The method of claim 2, wherein the anti-phishing protection action further includes:
   marking a communication session between the application and the Internet resource as blocked;
   detecting a system call's response call that includes content received from the internet resource during the blocked session;
   modifying the system call's response by replacing the content with redirection information, wherein the redirection information includes at least an internet protocol (IP) address of the advisor server and the extracted URL; and
   sending the modified system call's response to the application, thereby causing the application to access the advisor server.

8. The method of claim 7, wherein the redirection information further includes at least one of: the extracted URL and a message indicating the detected DNS error.

9. The method of claim 8, wherein the web page generated by the advisor server includes a list of hyperlinks related to the extracted URL.

10. The method of claim 9, wherein one or more of the hyperlinks are sponsored links.

11. The method of claim of claim 2, further comprising:
    performing the anti-phishing protection action when both the DNS error code and the phishing attempt are detected.

12. The method of claim 1, wherein the anti-phishing blacklist is retrieved from a third-party anti-phishing server and updated periodically.

13. The method of claim 1, wherein capturing of system calls is enabled by hooking to an application programming interface (API) of the operating system.

14. A non-transitory computer readable medium having stored thereon computer executable code when executed causing a processor to perform a process of anti-phishing and domain name protection, comprising:
    capturing a system call sent to an operating system of a client by an application requesting an access to an Internet resource;
    extracting a URL included in the captured system call;
    capturing a response to the system call sent from operating system;
    determining when the system call's response includes a domain name system (DNS) error code, wherein the determination of when the system call's response includes a fake IP address includes: sending a DNS resolution request to a DNS with a non-exist domain name; determining when the DNS returns a valid IP address; and when the DNS returns a valid IP address, then the IP address returned by the system call's response is a fake IP address generated by a DNS hijacker;
    checking the extracted URL against an anti-phishing blacklist to determine when the Internet resource is a malicious website;
    performing a DNS error correction action when any one of a DNS error code and a fake IP address was detected; and
    performing an anti-phishing protection action when the internet resource is determined to be a malicious website.

15. The non-transitory computer readable medium of claim 14, wherein each of the DNS error correction action and anti-phishing protection action causes redirection of the application to an advisor server, wherein the advisor server generates a web page to be displayed by the application.

* * * * *